Aug. 4, 1925.
A. E. SHUTTERLY
DISPENSING DEVICE FOR POWDERS
Filed Feb. 21, 1922
1,548,558
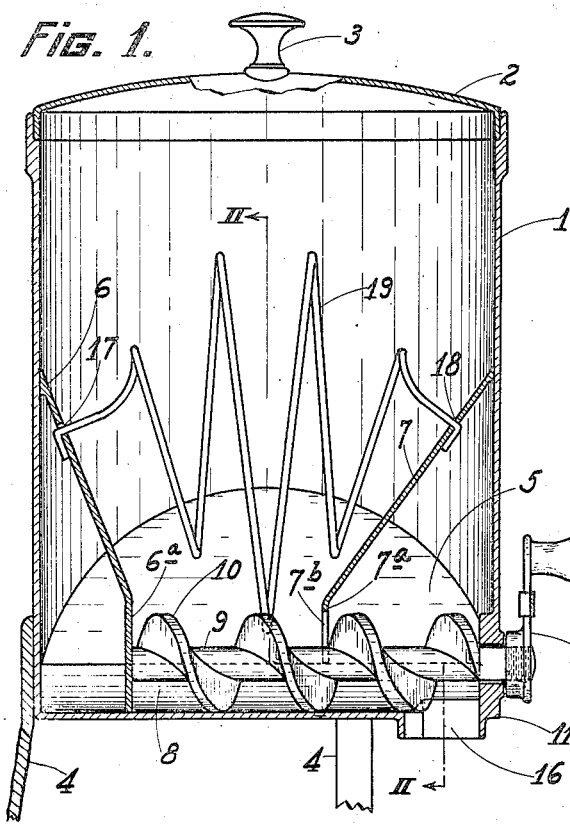
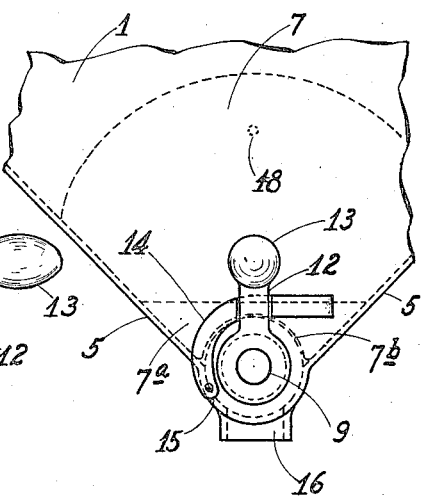
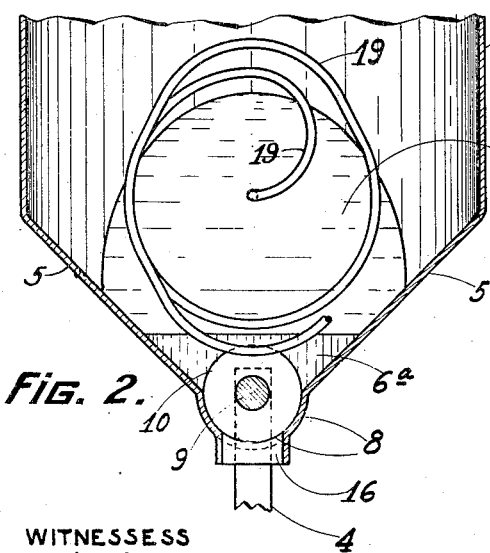
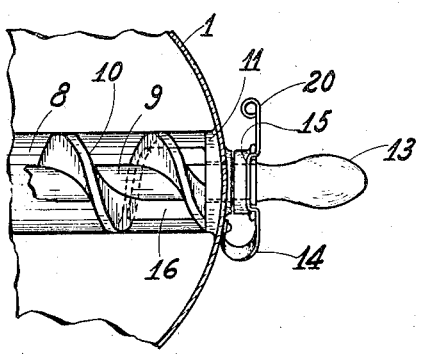
WITNESSES
INVENTOR
Acallious E. Shutterly
by Winter & Brown
ATTORNEYS Patented Aug. 4, 1925.

1,548,558

UNITED STATES PATENT OFFICE.

ACALLIOUS E. SHUTTERLY, OF INDIANAPOLIS, INDIANA, ASSIGNOR OF ONE-HALF TO L. A. THOMPSON, OF WAUKESHA, WISCONSIN.

DISPENSING DEVICE FOR POWDERS.

Application filed February 21, 1922. Serial No. 538,151.

*To all whom it may concern:*

Be it known that I, ACALLIOUS E. SHUTTERLY, a citizen of the United States, and a resident of Indianapolis, in the county of Marion and State of Indiana, have invented a new and useful Improvement in Dispensing Devices for Powders, of which the following is a specification.

This invention relates to receptacles for containing and dispensing powdered materials.

More particularly it relates to such containers adapted for holding powdered materials that have a tendency to cohere slightly, and which are to be withdrawn in small measured amounts at irregular intervals.

Among the objects of the invention are to provide such a container in a simple, compact, sanitary and ornamental form. More particularly the object is to provide such a container especially adapted for dispensing such powdered materials as malted milk in amounts suitable for making up fountain drinks. Other objects are to provide means to shake down the powdered material so that the entire contents of the device may be removed by the measuring apparatus; and to deliver an accurately measured amount for each actuation.

Referring to the drawings Fig. 1 is a central vertical section through the receptacle itself, the working parts not being in section; Fig. 2 is a partial vertical section on the line II—II of Fig. 1; Fig. 3 is a partial horizontal section and plan view of the device showing certain movable parts in locked position; and Fig. 4 is a partial side elevation of the parts shown in Fig. 3.

In dispensing malted milk at soda fountains it has heretofore been the custom to keep that material in glass jars, measuring it out by hand for use in the making of drinks with a long handled spoon. This requires the removal of the top of the jar, the reaching in for the spoon, and the digging out of an uncertain amount of the material by hand. There is a loss of time of the operator in this method of removing the powdered material. In addition frequently the covers of such jars are left off, so that dust and flies may enter. The amount of powdered malted milk so measured varies according to the discretion of the operator, i. e., according to the amount which happens to constitute his idea of a spoonful. This method of dispensing is wasteful of time and material, inaccurate and unsanitary.

The present invention furnishes a container and dispensing apparatus for the purposes above referrred to, which avoids all of the objections noted. Although it will be described and referred to as an apparatus for dispensing powdered malted milk, it will be understood that the device is capable of use with all other powdered materials which are to be intermittently measured out in equal amounts.

Referring to the drawings the apparatus comprises a main container 1, preferably in the form of a vertical drum, and made of some such material as cast aluminum, preferably nickel and polished. A tightly fitting cover cap 2 closes the upper end of the container, and a centrally positioned handle or knob 3 furnishes an easy means for removing the top. The device is supported by three or more legs 4, equally spaced apart, and attached to the exterior of the drum by any suitable means, such as welding or riveting. These legs are made long enough to permit the receptacle to which powder is to be delivered from the container to a stand underneath the delivery port referred to below.

Two sloping side walls 5 converging towards a middle line form the bottom of the container. The middle portion at the meeting point of these two sloping side walls 5, is in the form of a semi-circular trough-like portion 8. Two insert members 6 and 7 seat transversely between the sloping side walls 5. The member 6 has its upper portion sloped outwardly from the wall of the container, and then a vertical portion 6$^a$, which extends to the bottom of the trough 8. The other member 7 extends further towards the center of the drum and likewise has a vertical portion 7$^a$ which extends to the upper edge of the trough 8. This vertical portion 7$^a$ has a semi-circular opening 7$^b$ cut in the lower portion thereof. This semi-circular portion corresponds to the semi-circular shape of the trough 8, and the two cooperating form a circular opening just large enough to permit rotation of a screw below referred to in said opening. The partitioning members 6 and 7 may be of cast or pressed metal, and may be retained in position by gravity and the weight of powdered material, or by any desired means of permanent fastening, e. g. screws through the walls of the container.

By this arrangement of sloping walls 5, 6 and 7, the powdered material flows by gravity into the trough-like portion 8 of the drum. Consequently any powdered material in the container will slide freely down the sloping walls 5, 6 and 7 into the trough 8 in position to be removed therefrom as below described.

Centrally mounted in the trough 8 is a screw member comprising a cylindrical portion 9 and a flange member 10, such as is usual in screw conveyors. At one end this screw abuts against the wall 6 of the container 1, and is accurately positioned thereagainst. At the other end the cylindrical portion 9 passes through a bore in the thickened bearing portion 11 in the outer wall of the container 1.

Threaded on the outer end of the cylinder 9 is a crank 12 having a terminal handle 13. This is adapted to rotate the screw in its bearing and in trough 8 as will be obvious. On the outer face of the bearing portion 11 there is fastened a spring latch 14. This may be attached to the member 11 by any suitable means as for example by screw 15. The spring is shown shaped so that its free end is doubled back upon itself so as to contact with the crank 12. A portion of the spring is bent inward, then across, and then outward to form a depressed portion 15, adapted to engage the crank arm 12, and to hold it in a fixed position, as indicated in Fig. 4. Obviously other forms of springs or latches may be used to secure the same result.

The trough portion 8 has an opening 16 at one end on its underside, positioned directly under the axis of the conveyor screw. This opening has its inner edge cut to follow the middle line of the screw flange, so that when the screw is in normal locked position the opening is completely sealed against leakage from the trough. The member 7 screens the screw above the opening 16, and prevents leakage of any powder from the receptacle as will be obvious.

Retained by holes 17 and 18 in the members 6 and 7 is a spiral spring member 19, which extends across the container between the two walls. This spring member extends downward below the level of the winding flange of the screw, as illustrated in Fig. 1. At each rotation of the screw one turn of the coil spring is engaged by the thread of the conveyor, carried forward until it rides over the thread, and then released, flying back into place with considerable force.

The operation of this dispensing apparatus is as follows:

The lid 2 is removed and the container is filled with the powdered material to be dispensed. When it is desired to utilize a portion of this powder, as for example in mixing a malted milk drink, the operator depresses the outer end 20 of the spring 14 sufficiently to release the crank 12, and then gives that member a complete turn by means of the handle 13. As the crank comes around towards its original position it rides upon the spring 14 until it is opposite the grooved portion 15, whereupon the groove 15 will immediately engage the handle, preventing it going any further than the point where one complete turn thereof is completed.

The pitch of the screw flange 10 is such that there is carried out of the container and delivered through the opening 16 at each complete turn of the screw exactly the required amount of powder. Screws of various sizes and pitches may be provided according to the amount of material that is to be delivered at each time. This amount may be made equivalent to the smallest amount of powder that is required for a single use, and other uses requiring other amounts may then be obtained by multiples of the amount delivered. For example, the pitch of the screw may be such that at each complete turn thereof there is delivered a heaping teaspoonful of the powder. If two, three or more spoonfuls are desired, an equal number of turns will deliver exactly the amount needed. The powdered material being removed from the container by the conveying mechanism illustrated falls through the opening 16 into a glass or other receptacle placed thereunder, and it will be observed that the screw is so arranged that the flange on the underside thereof comes to the edge of the opening 16 at the end of each turn. By this means a complete charge of powdered material will be delivered accurately and positively at each turn of the screw, and that member will be left in exactly the same relative position at the end of each rotation. The apparatus may be of any desired size, to handle anything from a spoonful of malted milk to a wagon-load of coal.

Malted milk (and many similar powdered or granular materials) has a tendency to stick together, and to form lumps. Particularly it has a tendency to cohere about the walls of a container. It is necessary therefore in any device which delivers this material through an opening in the bottom that means be provided to scrape it down from the walls of the container, or otherwise to insure its uniform delivery. I have provided such means in the form illustrated, comprising the coiled spring member 19, extending entirely across the container, and contacting with the upper portion of the flange of the screw. At each rotation of the screw the flange thereof engages the lower portion of the spring member 19, carries it forward a certain distance until the coiled spring rides over the flange and flies back to its original position. This agitates the entire volume of powdered material, shakes it down, and insures the maintaining of the powder at a uniform level, and the supplying of the entire contents of the container to the trough 8, from which it may be dispensed as above described by screw conveying mechanism.

The many uses and advantages of my device will be apparent to those familiar with the art.

I claim:

1. In a device for storing powdered materials and dispensing measured charges thereof, the combination with a conveyor screw adapted to carry the powdered material to a delivery port from the container, of a coil spring member attached at its ends to the side walls of the container and having one of its coils in contact with the flange of the screw conveyor, whereby at each complete rotation of the screw the spring is carried out of normal position and released.

2. The combination with a container for holding and dispensing powdered materials comprising a screw conveyor positioned in the bottom of the container and adapted to deliver charges of the powdered material to an outlet port, of a coil spring member attached to the walls of the container, and engaging the threads of the conveyor, whereby at each complete revolution of the screw the spring is distorted and released.

In testimony whereof, I sign my name.

ACALLIOUS E. SHUTTERLY.

Witness:
EDWIN O. JOHNS.